Aug. 1, 1939.  W. C. HEDGCOCK  2,168,291

CAR TRUCK AND CLASP BRAKE ASSEMBLY

Filed Dec. 17, 1934  4 Sheets-Sheet 1

Inventor:
William C. Hedgcock.
By Wilkinson, Huxley, Byron & Knight
Attys Aug. 1, 1939.  W. C. HEDGCOCK  2,168,291
CAR TRUCK AND CLASP BRAKE ASSEMBLY
Filed Dec. 17, 1934  4 Sheets-Sheet 3

Inventor:-
William C. Hedgcock

Patented Aug. 1, 1939

2,168,291

UNITED STATES PATENT OFFICE 2,168,291

CAR TRUCK AND CLASP BRAKE ASSEMBLY

William C. Hedgcock, Wilmette, Ill., assignor to American Steel Foundries, Chicago, Ill., a corporation of New Jersey Application December 17, 1934, Serial No. 757,747

14 Claims. (Cl. 188—207)

This invention relates to a novel truck and clasp brake assembly for railway cars, characterized as having an exceptionally short wheel base and a reduced overall length rendering it particularly suitable for use on various types of cars where more space is needed between the trucks, and in addition, providing adequate space within the confines of its dimensions to accommodate clasp brakes and the necessary rigging therefor.

It is an object of this invention to provide in combination with a truck for railway cars, a new and useful clasp brake rigging which is particularly adapted for use with trucks of reduced wheel base.

Another object is to provide a new and useful truck bolster construction and a new and useful side frame construction both of which are adapted for use with other parts, to provide a truck assembly of diminished wheel base and restricted overall length.

A further object is to provide various elements requisite for a good, satisfactory and strong railway truck of reduced wheel base in combination with clasp brakes and the necessary rigging therefor, whereby the brakes are practically operative and the entire truck and brake assembly is particularly useful on cars where the limitations of space are fixed and restricted, such as for instance, on hopper ore cars.

A further object is to provide a practically operative clasp brake rigging for use on trucks having an exceptionally limited wheel base which provides suitable clearance for hopper drop doors and door operating mechanism on the car body.

At the present time, there is an increasing demand for railway cars which are more efficient in their construction in the utilization of the limited space allowed for their structural parts. This demand is attributable to the increasing need for cars of larger capacities and also to the development of improved designs and new accessory equipment which is mounted on or under the car and occupying an increasing share of the limited allowed space. The satisfaction of this demand necessarily involves restricting the allowable space for other parts of the car construction such as the trucks, brake rigging, etc. As capacities increase, the load on the various parts, such as the trucks, and brakes, is correspondingly increased and consequently such parts must be improved as to strength and practicability in service and yet at the same time, be designed to occupy less space than in the past.

As this demand for improvement exists for many types of rolling stock used in numerous different fields, this invention is not to be restricted as to the type of car to which it is applied but for purposes of illustration, the invention will be described by way of example, in connection with hopper ore cars, as this class of cars may be employed to show one practical and useful application of this invention.

Hopper ore cars are generally much shorter than other cars because of the great weight of ore relative to its bulk. The length, center to center of the couplers has become established at about 24 feet, and the spacing of pockets in ore docks has become necessarily established so as to receive the discharge of ore from a train of such cars.

The desired capacity of these cars is such that all possible space is demanded for hoppers at the center of the car between the trucks so that with the limitation on overall length, the space remaining for a truck at each end is exceedingly restricted. As a result, the truck wheel base for ore cars is now generally five feet compared to five feet, six inches or more, on ordinary cars; and with this, the end most peripheries of the wheels extend to the limits of available space so that there is no space for outside hung brake shoes with the result that the trucks are provided only with inside hung brake shoes.

A further difficulty, commonly in the way of outside hung shoes, is the hopper door operating mechanism which extends inwardly between the inner pair of wheels and adjacent the axle, thus occupying a part of the space naturally required for an outside brake beam.

With the great weight of ore cars and the correspondingly high braking power frequently employed, the brake shoe pressure is undesirably excessive where the number of shoes is limited to a single (inner) shoe per wheel as now employed. The inefficient frictional coefficient and unsatisfactory braking performance with high shoe pressure is well known as is also the marked improvement in these respects obtained with clasp brakes having two shoes, (one inner and one outer) per wheel.

It is therefore of great advantage to use clasp brakes on ore cars of this type but due to the limitation of space there has been no practical means of doing so prior to the present invention. By this invention, a new type of truck construction is provided which, when applied to ore cars can be made to have a wheel base as short as four feet and yet provide a highly practical and strong truck in service.

This invention further provides space for outside brake shoes whereby clasp brakes may be employed with the attendant elimination of the objections heretofore encountered.

To obtain the space for outside hung shoes and connections for a clasp brake, within the small overall truck length heretofore used without such shoes, the truck wheel base must be shortened from five feet to about four feet, which latter is exceptionally short for swiveled center bearing trucks of the type required to negotiate the sharp curves and irregular track in ore mines. This short wheel base brings the inside hung brake shoes and beams so close together as to preclude the use of a truck spring plank. The truck of this invention therefore has no spring plank but has two side frames of the pedestal type supported on springs mounted over the journal boxes, with the journal boxes vertically guided in the pedestals. The side frames are connected transversely of the truck and maintained in square relationship by the bolster which rests, at each end, directly on seats at the bottom of the centrally located bolster openings in the side frames. The bolster is provided with flanges embracing and interlocking with the edge of the seats on the side frames for spacing and squaring the latter. The side frames have extensions at each end providing pivotal brake hanger supports for the outside hung brake shoes.

Further, a truck bolster is provided having a special construction throughout that portion of its length lying between the side frames whereby good strength is realized and yet space is provided for accommodating the inside brakes within the limited space between the inner periphery of the wheels and end portions of the bolster.

A further advantage flows from the use of a pedestal type of truck in combination with the sole spring support between the journal boxes and the side frames, because there is only a limited vertical clearance afforded between the truck and portions of the car body, and with this truck, the clearance is not impaired by spring motion since the car body and truck structure move up and down virtually together, and consequently vertical space for the clasp brake connections is used to the best advantage.

A more accurate understanding of this invention may be obtained from an inspection of the accompanying drawings considered in the light of the following description. The drawings show in detail, one specific embodiment of the invention which is given merely for the purpose of illustration.

Truck frame

By referring to the drawings, it will be noted that the truck here illustrated comprises a bolster 20, and a pair of side frames 22, both of which are of a new and improved construction, and are described hereinafter in greater detail. The bolster is provided with ends 24 which project into the bolster openings 26, provided centrally of the side frames and rest directly on the seats 28, at the bottom thereof.

Figure 1:
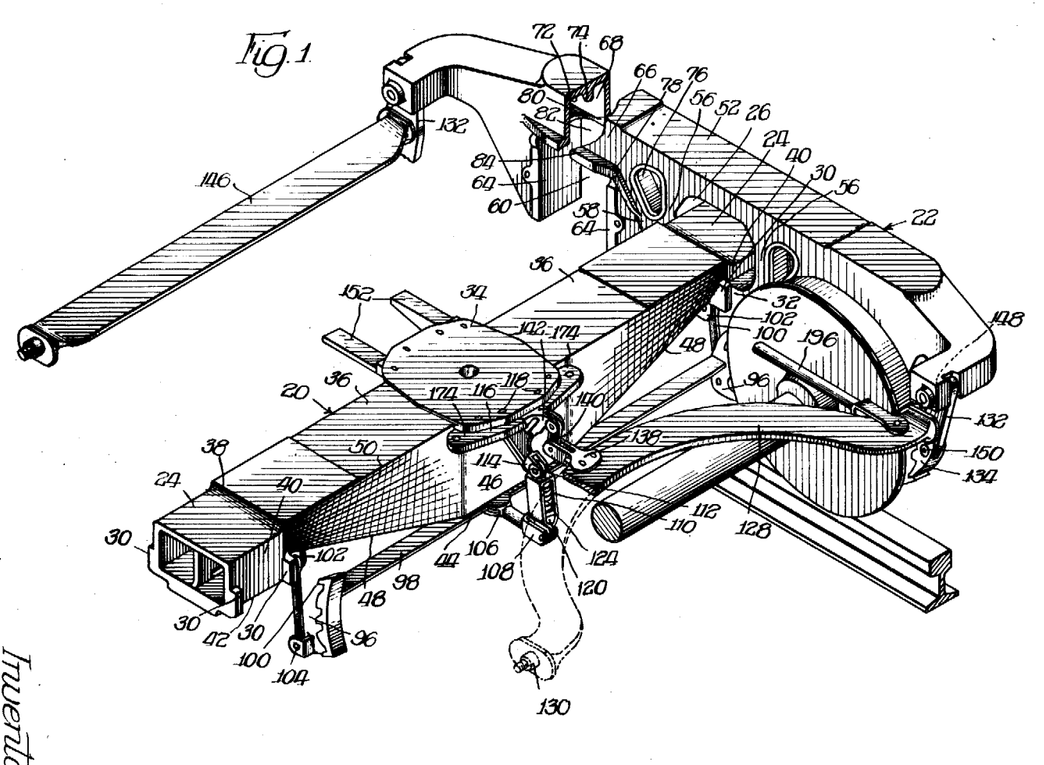
Figure 1 is a fragmentary view in perspective showing certain portions of a truck and clasp brake assembly constructed in accordance with this invention and with certain parts omitted to better disclose the features of novelty.
Figure 2:
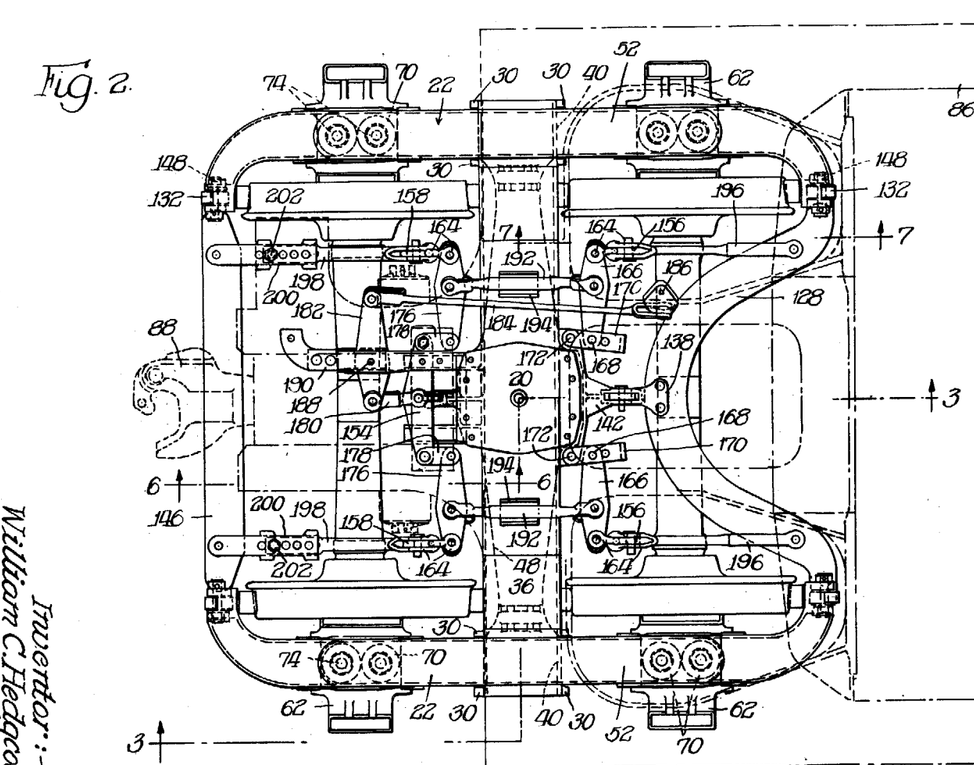
Figure 2 is a plan view of a railway truck and clasp brake asembly constructed in accordance with this invention.

Due to the greatly restricted wheel base, no spring plank is employed and the side frames are connected transversely and are maintained in a square relationship solely by the bolster and the locking lugs 30 on each side thereof which closely embrace the columns 56, of the side frame. Furthermore, no springs are provided between the bolster and side frames wherefore, when assembled, these parts serve somewhat as a unitary construction. The bolster openings 26 are sufficiently large at the top to receive the ends of the bolsters by endwise movement but are smaller at the bottom seat portions and have a rectangular configuration adapting them to closely engage and embrace the ends of the bolster so that after the bolster ends have been inserted into the enlarged upper openings, they may be lowered into the lower portion so as to rest squarely on the seats with the lugs 30 embracing the edges of the side frames as shown in Figures 1 and 2. The bolster thus holds the side frames properly spaced and due to the tightly fitting and interlocking relationship between the engaging parts, the truck is maintained properly squared.

Truck bolster

The truck bolster in its entirety, is best illustrated in Figure 1. It will be noted that it is of a general box construction having a center plate 34 and a substantially horizontal top wall 36. Adjacent the ends the top wall curves downwardly as at 38 to form ends 24 of reduced height. The end portions are provided with vertical side walls 40 having the above described locking lugs 30, and horizontal bottom walls 42 for engaging the seats 28 of the side frames.

Figure 7:
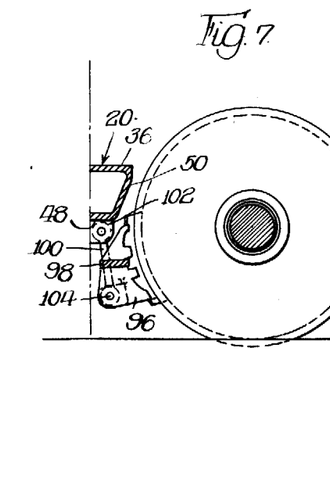
Figure 7 is an elevational view partly in cross section showing one end of the truck taken on the line 7—7 of Figure 2, and looking in the direction of the arrows.

The bolster is further provided with a bottom wall 44 which underlies the center plate 34 and provides with the side walls 46, a central portion of maximum height. The bottom walls 48 are inclined upwardly from the center toward the end portions as clearly illustrated in Figure 4. Furthermore, throughout this portion the side walls 50 are inclined inwardly from the top to bottom on a progressively increasing angle in the direction extending toward the end so that the bottom wall 48 in addition to slanting upwardly, is of progressively less width toward the ends of the bolster. This produces a new and improved configuration whereby satisfactory strength is realized while at the same time, additional clearance is provided for accommodating the upper toes of the inner brake heads and brake shoes and for application of the brake shoe keys. (See Figure 7.)

Side frames

Figure 3:
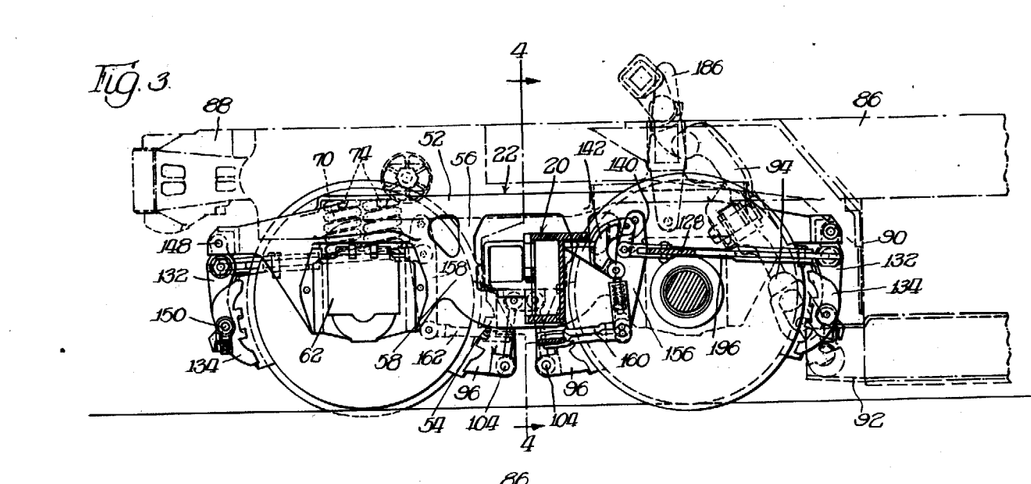
Figure 3 is a side elevational view partly in cross section taken on the line 3—3 of Figure 2 and looking in the direction of the arrows.

The side frames are best illustrated in Figure 1 and the left hand portion of Figure 3. It will be noted that these are of the truss construction having an upper compression member 52 and a lower tension member 54, the upper surface of the latter forming the bolster seat 28 between the spaced columns 56. The frames further have diagonal tension members 58 converging with the compression member 52 over the pedestal openings 60, which pedestal openings 60, are adapted to accommodate suitable journal boxes 62. The pedestal openings 60 are formed between downwardly extending pedestals 64 and the side frame member 66, the latter of which is located over the pedestal opening and is in the form of a downwardly extending pocket 68 for receiving and accommodating the coiled truck springs 70 which are seated against the under side of the top wall 72 of the pockets.

Projecting downwardly from the top wall 72 are a plurality of lugs 74 shown in Figures 1 and 3 which are adapted to enter the central opening of the coil springs for maintaining the latter against accidental displacement.

The diagonal tension member 58 is U-shape in section as may be seen through the windows 76 in Figure 1, where as the upper compression member 52 has a sectional configuration of an inverted U. Both of these members are thus provided with a transverse web and vertical flanges which produce a strong structure for both vertical and transverse loads. With the vertical load on the bolster seat of the side frames, and the latter supported at the spring pockets, a critical stress point in the structure occurs at the point 78 where the diagonal tension members 58 join the horizontal bottom edge of the spring pocket and where the section radically changes shape.

Except for the spring pockets the transverse web of the diagonal tension members 58 could be continued beyond the top upper edges in a horizontal direction so as to join the bottom edges of the flanges of the spring pocket construction and thus form therewith a structure of rectangular section instead of inverted U section. This additional transverse web would provide great additional strength at the point of critical stress.

In the present construction, it will be noted from Figure 1, that this has been accomplished in so far as possible consistent with the mounting of the springs, and that a bottom transverse web 80 is provided as best shown in Figure 1. This web however, is cut away to form an opening 82 for accommodating the coil springs.

The diagonal tension member web turns the corner at 78 and is bifurcated and merged with the side walls of the spring pockets 66, with an arcuate shaped edge which provides the necessary clearance for the truck springs. The same is true at the opposite side of the springs as shown at 80. To compensate for the reduction in area of the web at the point where the spring openings occur, lateral flanges 84 are provided on the outsides of the walls 66 following the bottom edge of the spring pocket and continuing around the turn at 78 and partly down the tension members 58. This arrangement provides a construction which merges one section into the other with adequate strength and at the same time with proper clearance for the truck springs.

Inner brake construction

With the very short truck wheel base, the inside brake beams with their associated brake heads are placed closely adjacent back to back to each other and closely beneath the truck bolster. The truck bolster is constructed in the manner described above with the side walls thereof inclined inwardly and with the bottom wall narrowed adjacent the ends to provide clearance for the upper toes of the brake heads and brake shoes and for application of the brake shoe keys. On account of the limited space, the inner brake heads 96 are connected by means of a brake beam 98 which is positioned closely beneath the truck bolster with the brake heads closely adjacent the bolster. The novel construction of the bolster permits the use of inside brake beams on a truck having a sufficiently short wheel base to permit the use therewith of outside hung brakes without sacrificing the advantages of a reduced overall truck length.

The inner brake heads, contrary to usual practice, are carried by brake hangers 100 pivotally mounted on brackets 102 formed integrally on the under side of the bolster. Thus, the brake heads are pivotally hung from the bolster rather than from the side frames. Due to the fact that the brake beams 98 lie closely beneath the truck bolster and the brake hanger brackets 102 are positioned closely above the brake heads as is virtually necessary in a truck having a wheel base as short as that described herein, there is not space for a sufficient length of brake hanger if the hanger is connected to the brake head in the usual way, that is to say, within the plane of the latter.

Accordingly, novel brake hanger and brake head constructions are employed as elements of this invention, in which the pivotal connections 104 for the hangers 100 are provided on the outside of the brake heads 96 so that the hangers 100 may be formed of increased length sufficient to provide the necessary radial motion without assuming undue angularity. In other words, the pivotal connection between the brake heads and the brake hangers is outside of the plane of the brake head and near the bottom thereof as clearly shown in Figure 1.

The inner brake beams 98 are further supported centrally of their lengths by balance hangers which comprise brackets 106 which are bifurcated and riveted to the brake beams and have a yoke 108 at their projecting ends for pivotal connection with the resilient extension hangers 110. These hangers are pivotally connected as at 112 to the lower depending arm 114 of a bracket 116 secured to the central portion of the bolster by means of rivets 118 projecting through the bracket and the projecting edge of the center plate 34. Since the inner brake beams 98 are suspended by brake hangers 100 and balance hangers 110, from the bolster of the truck frame, and the truck frame is spring supported on the journal boxes, it follows that vertical motion of the truck on the supporting springs causes angular misalignment of the brake shoes with the wheels unless means are introduced to compensate for such movement. The novel resilient extension hangers 110 are provided for this purpose.

The extension hanger proper comprises a lower clevis 120 which is pivotally connected as above described, to the central bracket of the brake beam and is provided at its top with a hole through which extends a rod 122, pivotally connected to the bracket arm 114 at 112. The lower end of this rod is enclosed within the walls of the clevis and in addition there is a coil spring 124 embraced by the clevis and installed between the clevis and the rod by a nut 126 on the end of the rod. This construction affords a resiliently extensible pivotally connected balance hanger for the brake beam whereby the brake beam is supported in the released position and yet is enabled to adjust itself to the wheel when the brakes are applied under varying conditions of truck spring movement. The nut 126 being threaded on the rod 122 also permits adjustment of the hanger length to obtain the proper condition of normal brake beam alignment.

*Outer brake construction*

Parts of the car body are shown in broken outline in Figures 2 to 6. In Figure 3, the car body is shown as at 86, having a coupler 88 projecting from the end of the car and a hopper depending from the central portion of the car between the trucks. The hopper is provided with a hopper door 92 (shown in dropped position) having door operating mechanism 94. It will be seen that the distance between the end of the car and the adjacent end of the depending hopper is fixed and restricted, and that the height of the body above the rail is likewise fixed and restricted. It will be further seen that the hopper doors, when dropped, swing down closely adjacent the inner pair of wheels, with the door operating mechanism extending divergently down from the body to the doors between the inner pair of sills.

Figure 6:
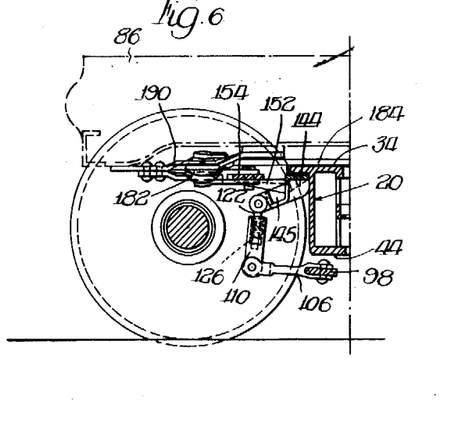
Figure 6 is an elevational view in cross section of one half of the truck as taken on the line 6—6 of Figure 2, and looking in the direction of the arrows.

The position of the hopper doors 92 and door operating mechanism 94 at the inner end of the truck prohibits the use of the usual brake beam or hanger lever connectors which normally extend directly across the inner end of the truck for connecting the outer brake shoes of the inner pair of wheels. Accordingly, the present invention provides a novel brake lever connector 128 having a trunnion 130 at each end for pivotal connection to the hanger levers 132, for actuating the brake heads 134 at the inner end of the truck.
This connector, which serves as a beam for connection with the pull rods 196 is offset and arched laterally to clear the door operating mechanism, and extends over and above the adjacent axle. Inasmuch as this beam is pivotally mounted on its trunnions, the eccentrically disposed weight thereof would cause it to swing downwardly, out of its desired plane, and accordingly, the central arched portion thereof is provided with a rigidly attached bracket 138, by which the unbalanced weight is carried by a link 140, pivotally connected to the upwardly extending arm 142 of the bracket 116. The brake lever connector 146 (Figure 1) at the outer end of the truck is not arched but straight and therefore requires no special balancing means such as is used for the brake lever connector 128 on the inside of the truck. However, the bracket 144 on the inward side of the bolster has the downwardly extending arm 145 furnishing a pivotal support for the resilient extension hanger 110 (Figure 6).

The bracket 144 is further modified to include integral spaced extensions 152 which serve as supports for the sliding horizontal equalizer 154 of the brake operating rigging.

Figure 5:
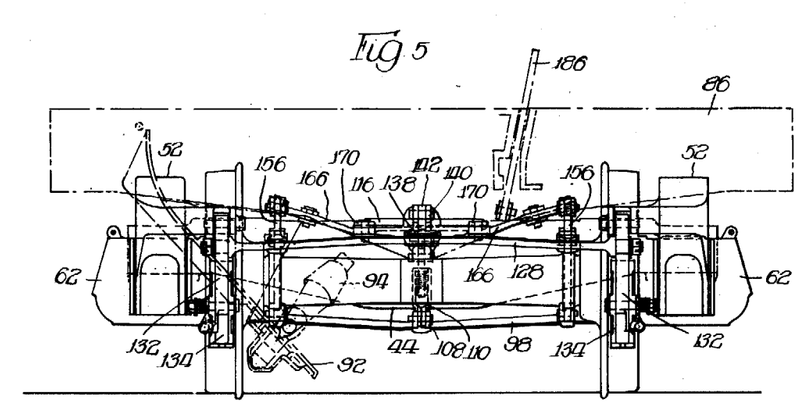
Figure 5 is an end elevational view of the truck and brake assembly disclosed in Figure 2 and as viewed from the right hand side of said figure.

As shown in Figures 1, 3 and 5 the outside brake levers 132 are pivoted at 148 to the ends of the side frames with their lower ends pivoted as at 150 to the brake heads 134.

*Brake rigging*

This invention contemplates any suitable operating rigging for the clasp brake mechanism. However, as here illustrated, a preferred system is that invented by W. H. Baselt, disclosed in United States Letters Patent No. 1,917,354, issued July 11, 1933. By referring to Figures 2 and 3, it will be noted that this system of rigging comprises live truck levers 156 and 158 located respectively on opposite sides of the truck on the inside between the wheels. The levers 156 are connected at their lower ends, to fulcrum members 160 secured to the brake beam 98 adjacent the ends thereof. Levers 158 are connected in a similar manner to the inner brake beam 98 on the opposite side of the truck by means of fulcrum members 162. The upper ends of the live truck levers 156 are pivotally connected respectively, through a pair of clevises 164 to the dead levers 166, and said dead levers are fulcrumed at 168 to the bracket 116 anchored to the bolster, by means of links 170 which are in turn pivotally connected as at 172 to the projecting ears 174 of the bracket 116.

The truck levers 158 are connected through similar clevises 164 to live levers 176 which are in turn connected by links 178 to the ends of a floating or equalizing lever 154. As above described, this equalizer is slidably supported in the horizontal position on the extensions 152 of the bracket 144. The pairs of clevises 164 permit of relative angular motion between the levers connected thereby and provide a substantially universal connection within the operative limitations of the levers.

The floating or equalizing lever 154 is connected by means of a link 180 to a dead lever 182 which dead lever is in turn pivotally connected to a rod 184 and lever 186. The lever 186 extends upwardly as shown in Figure 3 and provides a means connected to a brake operating pressure cylinder, not shown. The dead lever 182 is pivoted as at 188 to a bracket 190 which holds the same in an angular plane so as to permit the rod 184 to pass above the bolster. The live levers 176 and dead levers 166 are connected respectively, intermediate their ends by tie rods 192 which pass above the bolster due to the angular disposition of said levers as shown in Figure 5.

Figure 4:
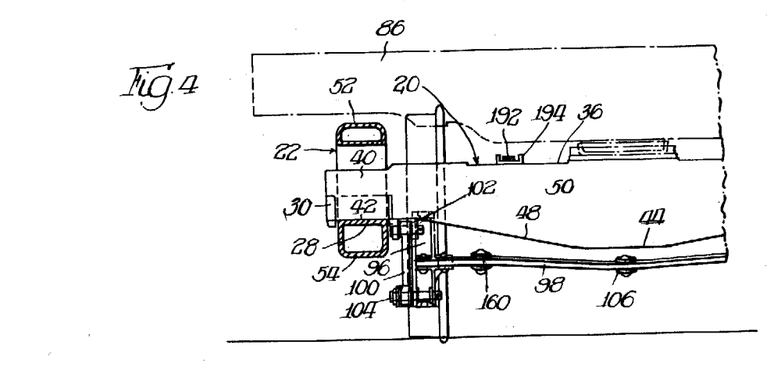
Figure 4 is an elevational view partly in cross section showing one half of the truck and brake assembly and taken on the line 4—4 of Figure 3 and looking in the direction of the arrows.

Rods 192 lie closely above the bolster and slidably rest on guiding supports 194 securely mounted on top of the bolster as shown in Figures 2 and 4. Connecting rods 196 are employed for connecting the live truck levers 156 to the arcuate brake lever connector 128 and, connecting rods 198 are employed for connecting the live truck levers 158 to the brake lever connector 146 located at the outside end of the truck.

For taking up slack in the brake rigging the connecting rods 198 are provided with slack adjusters 200 comprising slidably adjustable members having a holding bolt and nut 202. It will be obvious that the parts of the rod 198 may be held by the bolt 202 in any position of adjustment by aligning the proper holes and bolting the same in the manner indicated. Through the rods 196 and 198, the live truck levers 156 and 158, and the fulcrum members 160 and 162, the brake beams 98 and their corresponding brake heads 96 are connected into the brake rigging and thus are connected for operation with the outside brake heads 134.

*Operation of brakes*

For operating the brakes, a pressure cylinder, not shown, is suitably connected to the upper end of lever 186 so as to move the same toward the end of the car when the brakes are applied. The brake applying force will be thus transmitted through lever 186, rod 184, dead lever 182, and link 180, to the equalizing lever 154 and thus cause the latter to move toward the end of the car. This equalizer is free to slide on the extensions 152 of bracket 144. The equalizing lever being connected at both ends to the live levers 158, acts to set the brakes for the pair of wheels nearest the end of the car. This is accomplished by movement to the right (Figure 2) of the outer ends of the live levers 176, which pull the outside brake shoes 134 through rods 198 toward the wheel and at the same time pull the inner brake shoes 96 in the opposite direction toward the wheels. Inasmuch as the live levers 176 are connected through rods 192 to the dead levers 166, the outer ends of the last named levers are moved toward the left (as shown in Figure 2). Thus by means of the rods 196, the other pair of outer hung brake heads 134 are moved toward their associated wheels and likewise the other pair of inner brake shoes 96 are moved in the opposite direction toward said wheels. Thus it will be seen that the entire rigging system is interconnected for applying the clasp brakes on all four wheels by means of the single actuated lever 186.

It will be further seen that the present rigging, though similar to the system shown in the above named patent is somewhat different in that it is supported largely from the bolster. The inner brake beams are supported by means of the resilient extension hangers 110 and hangers 100 both of which are pivotally carried by the bolster. The actuating live and dead levers 176 and 166 respectively, are likewise carried by the bolster, through the instrumentality of the links 170 and the bracket arm 152. Finally the rods 192 rest in the guide supports 194, carried on top of the bolster.

From the above description of one embodiment of the present invention, it will be apparent that the invention provides a highly efficient, strong and practical truck and clasp brake assembly characterized as having an exceptionally short wheel base and in this illustration, as being particularly adapted for use on ore hopper cars or other types of hopper cars which have drop door operating mechanism located between the inner set of wheels.

It is to be understood that this invention is not to be limited to the exact embodiment of the device shown as this is given merely by way of illustration and not limitation, and because various other forms of the device will be apparent to those skilled in the art which do not depart from the spirit of the invention or the scope of the appended claims.

I claim:

1. A truck bolster of box girder construction having a seat at the end for supporting the same in a side frame and a brake hanger bracket on the underside adjacent said seat for swingingly supporting a brake beam.

2. A truck bolster of box girder construction having seats at its ends for supporting the same in side frames, and side walls which, throughout a portion of their length, are inclined inwardly from top to bottom with the inclination thereof progressively increased from the central to the end portions thereof and brake hanger brackets on the underside of said bolster adjacent said seats for swingingly supporting a brake beam.

3. In a truck and brake assembly, the combination of a truck bolster, a brake beam with a brake head, and a brake hanger pivotally connected to said truck bolster above the horizontal plane of said brake beam and pivotally connected to said brake head below the horizontal plane of said brake beam, said brake hanger being disposed to one side of said brake head outside the vertical plane thereof.

4. In a truck and brake assembly, the combination of a truck, including a truck bolster, a brake beam with a brake head attached thereto, and a brake hanger pivotally connected to the under side of said bolster above the horizontal plane of said brake beam and pivotally connected to said brake head below the horizontal plane of said brake beam.

5. In a truck and brake assembly, the combination of a truck, including a truck bolster, a brake beam with a brake head attached thereto, and a brake hanger pivotally connected to said bolster above the horizontal plane of said brake beam and pivotally connected to said brake head below the horizontal plane of said brake beam, said brake hanger being disposed to one side of said brake head outside the vertical plane thereof.

6. A truck and brake assembly comprising a truck including a pair of side frames having bolster seats, and a bolster supported at its ends directly on said bolster seats and having inclined side walls adjacent the end thereof providing clearance for brake heads; brackets on said bolster and brake hangers pivoted to said brackets, and brake heads pivotally mounted on the lower ends of said hangers and occupying in use, the clearance provided by the inclined walls of said bolster.

7. A truck and brake assembly comprising a truck including a pair of side frames having bolster seats, and a bolster supported at its ends directly on said bolster seats and having inclined side walls adjacent the end thereof providing clearance for brake heads; brackets on said bolster and brake hangers pivoted to said brackets, and brake heads pivotally mounted on the lower ends of said hangers and occupying in use, the clearance provided by the inclined walls of said bolster, said brake heads being connected by a brake beam located in a plane intermediate the planes of the pivots of said hangers.

8. In a truck having side frame members, a bolster, and an axle and spaced wheels, the combination of hanger levers pivotally connected to said truck frame members at one side of said pair of wheels, a hanger lever connector trunnioned at each end in said hanger levers and offset laterally between said wheels and toward said truck side frame members at one side of said bolster and the offset portion of said connector for supporting the latter and brake rods connected to said hanger lever connector.

9. In a truck and brake assembly, the combination with an axle and spaced pair of wheels, of a pair of side frames and a connecting truck bolster, hanger levers pivotally connected to said side frames at one side of said pair of wheels, a hanger lever connector trunnioned at its ends in said hanger levers and offset laterally between said wheels and toward said axle, and a pivotal connector on the offset portion of said hanger lever connector for supporting the same, and a bracket carried by said bolster for pivotally supporting said pivotal connector.

10. In a truck brake, the combination with an axle and spaced pair of wheels, of hanger members pivotally connected to truck side frame members at one side of said pair of wheels, a hanger member connector connected at each end to said hanger members and offset laterally between said wheels and toward said axle, and means on the offset portion of said connector for supporting the same from the truck bolster.

11. In a truck brake, the combination with an axle and spaced pair of wheels, of a transverse member connecting brake shoes on one side of the pair of wheels, another transverse member connecting brake shoes on the opposite side of the wheels, said transverse members each being swingingly supported adjacent each end thereof from truck members, and said transverse members each having a swinging third support intermediate said first named supports, both of said third supports being attached to the truck bolster.

12. In a truck brake, the combination with a truck bolster mounted for vertical motion with respect to an associated pair of wheels, of a brake beam carrying brake shoes for operation against said wheels, and a swinging brake beam support pivotally connected to the lower side of said truck bolster and pivotally connected to said brake beam, and an extensible member pivotally connected between said bolsters and brake beam.

13. In a truck brake, the combination with a truck bolster mounted for vertical motion with respect to an associated pair of wheels, of a brake beam carrying brake shoes for operation against said wheels, and a swinging brake beam support pivotally connected to the lower side of said truck bolster and pivotally connected to said brake beam, and an extensible and adjustable member pivotally connected between said bolster and brake beam.

14. In a truck and brake assembly, the combination with an axle and spaced pair of wheels, of a pair of side frames and a connecting truck bolster, brake heads pivotally hung from said bolster associated on the inside with said wheels and brake heads pivotally hung from said side frames associated on the outside with said wheels, transverse members connecting respectively, said inner and outer hung brake heads, said transverse members connecting said inner brake heads being supported intermediate its length by a resilient extension member carried by said bolster and said transverse members connecting said outer brake heads being offset toward said bolster and having means connecting said offset portion to said bolster.

WILLIAM C. HEDGCOCK.

CERTIFICATE OF CORRECTION.

Patent No. 2,168,291. August 1, 1939.

WILLIAM C. HEDGCOCK

It is hereby certified that error appears in the printed specification of the above numbered patent requiring correction as follows: Page 5, second column, line 48, claim 8, after the word "truck" insert side; line 52, same claim, for "truck side frame members at one side of" read axle, and a pivotal connection between; and that the said Letters Patent should be read with this correction therein that the same may conform to the record of the case in the Patent Office.

Signed and sealed this 19th day of September, A. D. 1939.

(Seal)

Henry Van Arsdale,
Acting Commissioner of Patents.

for supporting the same from the truck bolster.

11. In a truck brake, the combination with an axle and spaced pair of wheels, of a transverse member connecting brake shoes on one side of the pair of wheels, another transverse member connecting brake shoes on the opposite side of the wheels, said transverse members each being swingingly supported adjacent each end thereof from truck members, and said transverse members each having a swinging third support intermediate said first named supports, both of said third supports being attached to the truck bolster.

12. In a truck brake, the combination with a truck bolster mounted for vertical motion with respect to an associated pair of wheels, of a brake beam carrying brake shoes for operation against said wheels, and a swinging brake beam support pivotally connected to the lower side of said truck bolster and pivotally connected to said brake beam, and an extensible member pivotally connected between said bolsters and brake beam.

13. In a truck brake, the combination with a truck bolster mounted for vertical motion with respect to an associated pair of wheels, of a brake beam carrying brake shoes for operation against said wheels, and a swinging brake beam support pivotally connected to the lower side of said truck bolster and pivotally connected to said brake beam, and an extensible and adjustable member pivotally connected between said bolster and brake beam.

14. In a truck and brake assembly, the combination with an axle and spaced pair of wheels, of a pair of side frames and a connecting truck bolster, brake heads pivotally hung from said bolster associated on the inside with said wheels and brake heads pivotally hung from said side frames associated on the outside with said wheels, transverse members connecting respectively, said inner and outer hung brake heads, said transverse members connecting said inner brake heads being supported intermediate its length by a resilient extension member carried by said bolster and said transverse members connecting said outer brake heads being offset toward said bolster and having means connecting said offset portion to said bolster.

WILLIAM C. HEDGCOCK.

CERTIFICATE OF CORRECTION.

Patent No. 2,168,291.                                      August 1, 1939.

WILLIAM C. HEDGCOCK

It is hereby certified that error appears in the printed specification of the above numbered patent requiring correction as follows: Page 5, second column, line 48, claim 8, after the word "truck" insert side; line 52, same claim, for "truck side frame members at one side of" read axle, and a pivotal connection between; and that the said Letters Patent should be read with this correction therein that the same may conform to the record of the case in the Patent Office.

Signed and sealed this 19th day of September, A. D. 1939.

(Seal)                                                      Henry Van Arsdale,
Acting Commissioner of Patents.